UNITED STATES PATENT OFFICE.

MAX BAZLEN, OF LUDWIGSHAFEN-ON-THE-RHINE, GERMANY, ASSIGNOR TO BADISCHE ANILIN UND SODA FABRIK, OF LUDWIGSHAFEN-ON-THE-RHINE, GERMANY, A CORPORATION.

MANGANESE PEROXID SULFATE AND PROCESS OF MAKING SAME.

No. 837,777.   Specification of Letters Patent.   Patented Dec. 4, 1906.

Application filed September 2, 1903. Serial No. 171,701.

*To all whom it may concern:*

Be it known that I, MAX BAZLEN, a subject of the King of Würtemberg, residing at Ludwigshafen-on-the-Rhine, in the Kingdom of Bavaria, Empire of Germany, have invented new and useful Improvements in Manganese Peroxid Sulfate and Processes of Making the Same, of which the following is a specification.

I have discovered a process for manufacturing a sulfate of a higher oxid of manganese, to which substance I will refer as "manganese peroxid sulfate." I prepare this substance by the oxidation in the presence of sulfuric acid of a manganese body, such as metallic manganese, an alloy of manganese, or a manganous or manganic sulfate or by the reduction, also in the presence of sulfuric acid, of permanganates. The oxidation can be performed either electrolytically or by means of chemical oxidizing agents. The reduction can conveniently be effected by chemical agents.

My new manganese peroxid sulfate, which has a constitution corresponding to the formula $Mn(SO_4)_2$, is in the solid form a black substance. It is only stable in the presence of sulfuric acid containing about forty-eight per cent. or more of $H_2SO_4$, in which it dissolves, yielding a deep-brown to black solution. In substantially more dilute sulfuric acid or water it decomposes more or less rapidly, the decomposition being the more rapid the weaker the sulfuric acid is. These solutions in sulfuric acid containing forty-eight per cent. or more of $H_2SO_4$ can be heated to a temperature of from about 60° to 80° centigrade without appreciable decomposition taking place, but on continued boiling oxygen escapes and manganic sulfate is formed. On pouring a sulfuric-acid solution into water a brown solution is at first obtained; but this suddenly becomes discolored and hydrated manganese peroxid is precipitated.

The electrolytic oxidation of the manganese body to manganese peroxid sulfate can be performed in the presence of not too dilute sulfuric acid—for instance, such as contains from forty-eight to seventy-eight per cent. of $H_2SO_4$ at a moderately-high temperature—say from about 50° to 60° centigrade—and with a current of high density; but in some cases it is preferable to work at a somewhat lower temperature—say at from 20° to 30° centigrade. Not all substances that are employed as anodes in such electrolytic operations are suitable for the purposes of my invention, but among those which are adapted are lead, manganese, or manganese alloys. Oxidizing agents which are suitable for the purposes of my invention are permanganates, lead peroxid, chromates, and chlorates, while as reducing agents I can employ, among others, sulfurous acid, ferrous salts, or manganous salts.

The amount of manganese peroxid sulfate contained in a solution or solid can be arrived at by analysis. The manganese is determined in the usual manner after having reduced it to a manganous salt. The quantity of active oxygen can be determined by the aid of ferrous ammonium sulfate. The free sulfuric acid can be determined by reducing the salt with somewhat more than the necessary quantity of sodium sulfite and then titrating with normal caustic-soda solution. The total sulfuric acid can be determined by titrating with normal caustic-soda solution, the latter being added at first in insufficient quantity to completely neutralize the whole, whereupon the solution is heated, filtered from manganese peroxid, which separates out, the precipitate washed, and the titration of the filtrate then completed. The results of such an analysis show that the manganese peroxid sulfate possesses a constitution corresponding to the formula $Mn(SO_4)_2$.

The following examples will serve to further illustrate the nature of my invention, but it is not confined to these examples. The parts are by weight.

*Example 1. Manganese Peroxid Sulfate from Manganese Sulfate by Means of Electrolysis.*

Dissolve four hundred (400) parts of finely-powdered manganous sulfate ($MnSO_4.4H_2O$) in four thousand three hundred and thirty (4,330) parts of hot sulfuric acid containing about fifty-five and a half (55½) per cent. of $H_2SO_4$. Pour the solution into a vessel provided with a suitable diaphragm and stir well and oxidize by means of a lead anode at a temperature of from fifty to sixty degrees centigrade (50°–60° C.) The cathode consists of lead in sulfuric acid containing about fifty-five and a half (55½) per cent. of $H_2SO_4$. The current density at the anode should be from about fifteen to sixteen (15-16) amperes per square decimeter. Continue the electrolysis until a strong evolution of oxygen can be observed. A deep-brown solution of manganese peroxid sulfate is then obtained, from which small quantities of lead sulfate and manganic sulfate are deposited.

By employing in the above example larger quantities of manganous sulfate, so that the whole of this salt is not completely dissolved, a correspondingly-greater yield of manganese peroxid sulfate is obtained.

*Example 2. Manganese Peroxid Sulfate from Manganese by Electrolysis.*

Introduce into the anode department of an electrolytic cell sulfuric acid containing about seventy-eight (78) per cent. of $H_2SO_4$ and employ pure manganese or ferromanganese containing about eighty (80) per cent. of Mn as anode. The cathode consists of lead and is also surrounded with sulfuric acid containing about seventy-eight (78) per cent. of $H_2SO_4$. Electrolyze with a current of high density and about four (4) volts electromotive force at a temperature of from twenty to thirty degrees centigrade (20°-30°C.) Add from time to time sufficient manganous sulfate. Evolution of oxygen is hardly to be observed and a deep-brown solution of manganese peroxid sulfate is obtained. In employing ferromanganese a precipitate of ferric sulfate is also formed, which in concentrated solutions is usually mixed with manganese peroxid sulfate.

When electrolyzing sulfuric acid by means of manganese or ferromanganese, as above explained, a certain amount of permanganic acid anhydrid may be formed, which is reduced by the addition of corresponding quantities of manganous sulfate. It is also advantageous to employ more concentrated sulfuric acid than in Example 1, as sulfuric acid is used up in forming the sulfate of manganese peroxid.

*Example 3. Manganese Peroxid Sulfate from a Manganese Salt by Means of an Oxidizing Agent.*

Into a solution of manganous sulfate in sulfuric acid containing from about forty-eight to seventy-eight (48-78) per cent. of $H_2SO_4$ and at a temperature of from fifty to sixty degrees centigrade (50°-60° C.) add, while stirring, lead peroxid free from chlorin. A red solution or a precipitate of manganic sulfate is at first obtained, which on further addition of lead peroxid is converted, with the separation of lead sulfate, into a brown solution of manganese peroxid sulfate.

Instead of lead peroxid other oxidizing agents can be employed.

*Example 4. Manganese Peroxid Sulfate by the Interaction of Manganous Sulfate and Permanganate.*

*a. In solution.*—Dissolve one hundred and sixty-nine (169) parts of manganous sulfate dried at one hunderd and fifty degrees centigrade (150° C.) ($MnSO_4.H_2O$) in forty-seven hundred and eighty (4,780) parts of sulfuric acid containing about seventy (70) per cent. of $H_2SO_4$ and add one hundred and eight (108) parts of finely-powdered potassium permanganate in small portions at a temperature of from fifty to sixty degrees centigrade (50°-60° C.) while stirring well. Red manganic sulfate is at first formed. It is then converted into the brown manganese peroxid sulfate. Instead of manganous sulfate the equivalent quantity of manganic sulfate can be employed, in which case only half the above quantity of permanganate is necessary.

*b. In the solid form.*—To twenty-nine hundred (2,900) parts of sulfuric acid containing about fifty-five and a half (55½) per cent. of $H_2SO_4$ add six hundred and sixty-nine (669) parts of finely-divided manganous sulfate ($MnSO_4.4H_2O$) at a temperature of from fifty to sixty degrees centigrade (50°-60° C.) and then three hundred and sixteen (316) parts of potassium permanganate at first quickly, then slowly. A deep-black solution of manganese peroxid sulfate is obtained, from which, to begin with, but little of this salt separates out. On cooling, however, manganese peroxid sulfate separates out in solid form.

I claim—

1. The process of manufacturing manganese peroxid sulfate by subjecting a hereinbefore-defined manganese body to oxidation in the presence of sulfuric acid containing at least about forty-eight per cent. $H_2SO_4$ substantially as described.

2. As a new article of manufacture, manganese peroxid sulfate, which in the solid form is black, which possesses a constitution corresponding to the formula $Mn(SO_4)_2$, which dissolves in cold sulfuric acid containing from forty-eight to seventy-eight per cent. $H_2SO_4$ yielding from brown to black solutions which solutions yield on boiling oxygen and manganic sulfate.

In testimony whereof I have hereunto set my hand in the presence of two subscribing witnesses.

MAX BAZLEN.

Witnesses:
ERNEST F. EHRHARDT,
JACOB ADRIAN.